(12) United States Patent
Hascoat

(10) Patent No.: US 6,689,002 B1
(45) Date of Patent: Feb. 10, 2004

(54) TENSIONING DEVICE IN ROTATING MOVEMENT TRANSMISSION BY BELTS, CHAINS OR CABLES

(76) Inventor: Joël Hascoat, 12 rue du Colonel Moll, 93600 Aulnay-sous-Bois (FR)

( * ) Notice: Subject to any disclaimer, the term of this patent is extended or adjusted under 35 U.S.C. 154(b) by 0 days.

(21) Appl. No.: 09/926,206

(22) PCT Filed: Mar. 24, 1999

(86) PCT No.: PCT/FR99/00683

§ 371 (c)(1),
(2), (4) Date: Dec. 31, 2001

(87) PCT Pub. No.: WO00/57085

PCT Pub. Date: Sep. 28, 2000

(51) Int. Cl.⁷ .................................... F16H 7/12
(52) U.S. Cl. ........................ 474/135; 474/133
(58) Field of Search ................. 474/112, 135, 474/109, 101, 117, 133, 136, 113, 114

(56) References Cited

U.S. PATENT DOCUMENTS

| | | | |
|---|---|---|---|
| 3,358,521 A | 12/1967 | Browning et al. | 74/242.1 |
| 3,545,294 A | * 12/1970 | Dankowski | 474/112 |
| 4,696,663 A | * 9/1987 | Thomey et al. | 474/133 |
| 5,015,216 A | 5/1991 | Brandenstein et al. | 474/101 |

FOREIGN PATENT DOCUMENTS

| | | | | |
|---|---|---|---|---|
| DE | 3433004 A1 | * 3/1986 | | |
| DE | 2664343 A1 | * 2/1992 | | 474/112 |
| EP | 0 432301 A1 | * 6/1991 | | 474/112 |
| FR | 2 634 263 | 1/1990 | | |
| FR | 2 665 498 | 2/1992 | | |
| FR | 2 768 793 | 3/1999 | | |
| JP | 10 267094 | * 10/1998 | | |

* cited by examiner

Primary Examiner—Marcus Charles
(74) Attorney, Agent, or Firm—Westerman, Hattori, Daniels & Adrian LLP

(57) ABSTRACT

A tension roller with eccentric internal pivot and a tensioning device consists of a cylindrical roller having a shape adapted for each type of transmission housing one or several roller bearings, which are integral with a hub including a large base plate pivoting about a fixed axis. The eccentricity between the fixed axis and the axis of rotation of the roller enables, by the pivoting of the device about an axis, to cause the roller to travel along a circular path, with an amplitude twice the value fo the eccentricity, which provides the tensioning stroke of the transmission. The flange, housed in the hub, in its central part, is actuated by the screw clamping the device on the bearing surface. The hub may comprise one or several driving arms which enable to simultaneously exert and measure the tensile load of the transmission, using standard clamping tools available off-the-shelf.

19 Claims, 6 Drawing Sheets

CROSS-SECTION ALONG III-III

TENSIONING DEVICE IN ROTATING MOVEMENT TRANSMISSION BY BELTS, CHAINS OR CABLES

The present invention concerns a tensioning and immobilization device of a tension roller for transmission of rotational movements. Such transmission may be performed by flat belts, synchronous toothed belts, V belts; round or grooved belts; by single or multiple chains; by a cable or the like. The device according to the invention is a roller with an eccentric internal pivot mounted on a bearing surface of, for example, the support of the transmission.

BACKGROUND OF THE INVENTION

An immobilization device for a belt tensioning roller enabling fixing the hub of an eccentric-forming roller in an angular position determined relative to a bearing surface, such as one which is part of a housing, a cylinder head, etc., is already known, specifically in French Patent No. 2,665, 498.

This fixation of the hub is implemented- by means of a screw passing through the hub parallel to its axis of rotation to be screwed into the bearing surface. In this type of device, the shank of the aforementioned screw has on part of its length a smooth surface forming the axis of rotation of the hub of the roller. This hub can be rotated by means of an appropriate tool which engages in an opening provided on the surface of the roller opposite that designed to be in contact with the bearing surface. A fitting designed to accommodate the belt is mounted on a ball bearing, so as to turn freely around the hub. The interest of this device lies primarily in its minimal space requirement, resulting from the fact that the tensioning mechanism is internal to the roller.

Putting the roller into service consists of driving the hub of the roller, in rotation, around the shank of the screw until it assumes an angular position determined on the basis of the belt tension selected; then, in a second step, of fixing the hub in this position by tightening the clamping screw.

This device, with a small space requirement, has, however, three disadvantages:
- the adjustment stroke is short because it is associated with the value of the eccentricity, which is in turn limited by the passage of the fixation screw inside the interior diameter of the ball bearing.
- the tensile load of the transmission can be applied only with the help of a special wrench, placed in notches on the upper surface of the hub. The device, entirely cylindrical, does not permit the use of off-the-shelf wrenches.
- measurement of the tensile load can be performed only indirectly, when the device is stopped, in three ways:
  1) by measuring the elongation of the belt after tension,
  2) by measuring the path of deflection of the belt after tension,
  3) by measuring the frequency of vibration of the belt after tension using a special apparatus.

These methods of measurement of the value of the tensile load are not very precise and are difficult to implement. They use special means, not included among the usual tools of an assembly or maintenance shop. They require several successive adjustments and measurements. They are not direct measurements and, consequently, are imprecise. These measurement methods do not permit transmission of torque under optimum conditions of service life, of drive quality, of sound level. The tensile load must be determined and applied with precision.

SUMMARY OF THE INVENTION

The device according to the invention makes it possible to remedy these disadvantages. In fact, it consists of a tension roller with an eccentric pivot. It has a very small space requirement, since its components remain always inside the external diameter of the roller. It is fixed on the transmission support, using a large screw. Its large diameter base gives it good rigidity. Its tensioning stroke is adequate for most applications. The stroke and the tensile load are implemented using off-the-shelf clamping tools on a lower driving arm or an upper driving arm integral with the hub. The choice of one or the other depends on constraints of space and accessibility. The tensile load exerted by the roller on the transmission can be simultaneously exerted and measured directly, using a torque wrench. The device can be put in place, adjusted, and clamped into position from above the transmission support. This device, by way of nonrestrictive example, can be produced with a diameter from approximately 20 mm to a diameter of more than 300 mm, making it possible to extend its field of application, from office equipment to industrial machines.

The device according to the invention consists, in effect, of an external roller, with a shape suited to all types of transmission which may constitute a pulley for a flat belt, a synchronous toothed belt, a V belt, a round or grooved belt; a geared wheel for a single or multiple chains; a pulley for a cable. This roller accommodates one or a plurality of rotational guide fittings, which are integral to a hub which includes, according to a first characteristic, a clamping screw passing through the hub which acts on an intermediate part placed freely in a housing of the hub, with this intermediate part enabling the creation of a lateral offset between the axis of the clamping screw and a fixed pivot pin integral with the transmission support, with this fixed pivot pin consisting of a cylindrical portion constituting the rotation guidance of the hub, with a height defined between two faces, one of which rests on the bearing surface and the other is performed by the bottom of a cylindrical head which extends radially beyond the cylindrical part and which engages freely in a housing provided in the hub, with the distance between centers of the axes obtained by the aforementioned lateral offset enabling, by the rotation of the hub around the fixed pivot pin, when the clamping screw is not yet tightened, making the hub travel a circular path which constitutes the tensioning stroke of the device, the tightening of the clamping screw in the intermediate part, which acts as a flange and is supported at one of its ends, which has a projection, in the bottom of the housing and at the other end under the head of the fixed pivot pin, immobilizing the hub of the bearing surface by pressure and adhesion in the position determined.

The fixed pivot pin is eccentric relative to the axis of rotation of the roller but remains within the space occupied by the hub. The disassociation of the pivot pin and the clamping screw makes it possible to obtain maximum eccentricity while keeping all the components inside the external diameter of the roller. The self-locking nature and the stability of the unit is ensured by the large-diameter base of the hub. Since the face opposite the mounting surface on the transmission support is often inaccessible due to its shape, the presence of reinforcements, gussets, or mechanical elements, the installation and adjustment of the device can be carried out on the bearing surface of the transmission support, from above the tensioning device.

The device can be installed inside or outside the transmission.

According to a second characteristic, the hub has, in its base, a housing accommodating a lower driving arm integral with the hub, extending beyond the exterior of the base of the hub enabling, with the use of an off-the-shelf wrench or a torque wrench, pivoting the device around the fixed pivot pin and thus applying tension to the transmission.

The use of a torque wrench makes it possible to simultaneously apply and measure the force exerted and to thus obtain a specific, reproducible transmission tension.

According to a third characteristic, the hub has, in its upper part, a housing accommodating an upper driving arm integral with the hub, enabling, with the use of an off-the-shelf wrench or a torque wrench, pivoting the device around the fixed pivot pin and thus applying tension to the transmission.

The use of a torque wrench makes it possible to simultaneously apply and measure the force exerted and to thus obtain a specific, reproducible transmission tension.

According to another characteristic of the invention, the lower driving arm and the upper driving arm have ends adapted to accommodate additional devices for adjustment and position immobilization of the hub of the roller, devices for pulling or pushing by flexible or elastic elements, devices for pulling or pushing by remote control actuators, and control and safety devices detecting defects in the tensile load or in the angular position of the tension roller.

According to another characteristic of the invention, the intermediate part has no projection, the clamping screw holds said intermediate part in the bottom of the housing of the hub in a defined position permitting free pivoting of the intermediate part under the head of the fixed pivot pin and, consequently, free pivoting and sliding of the hub on the bearing surface, with the tensile load obtained by the action of a device for pushing or pulling acting on one or the other of the two driving arms.

According to another characteristic of the invention, the intermediate part consists, on the one hand, of a guide sliding in a housing of the hub parallel to the axis of rotation of the roller and, on the other, of a perpendicular flange extending from the guide supported against the head of the fixed pivot pin, which immobilizes the hub against the bearing surface by pressure and adhesion in the position determined, at the time of the tightening of the screw.

According to another characteristic of the invention, when the fixation of the device from below the transmission support is desirable, the intermediate part may have an internal screw thread accommodating the fixed pivot pin accessible from below the bearing surface which has an opening accommodating the cylindrical portion of the pivot pin, with the head of said pin being supported under the support of the transmission, with the tightening of the clamping screw ensuring immobilization by pressure and adhesion of the hub on the bearing surface.

According to another characteristic of the invention, the intermediate part is extended beyond the exterior of the base of the hub and constitutes the driving arm enabling exertion of the tensile load.

According to another characteristic of the invention, the lower driving arm, when it consists of a specific part, is removable and can be removed from the base of the hub by sliding in its housing, after adjustment of the tension of the transmission.

According to another characteristic of the invention, the lower and upper driving arms have, at their end, a protruding part with a polygon shape enabling the use of off-the-shelf clamping tools: open-end wrench, box wrench, ring wrench, adjustable wrench, socket wrench, torque wrench.

According to another characteristic of the invention, the intermediate part, when it is extended beyond the exterior of the base of the hub and constitutes the drive arm, has at its end a polygon-shaped protruding part enabling the use of off-the-shelf clamping tools: open-end wrench, box wrench, ring wrench, adjustable wrench, socket wrench, torque wrench.

According to another characteristic of the invention, the upper driving arm has a bore accommodating a pin concentric to the fixed pivot pin enabling, by means of a support integral with the transmission support, holding the end of the hub.

BRIEF DESCRIPTION OF THE DRAWINGS

The annexed drawings, provided solely by way of example, illustrate the invention.

DETAILED DESCRIPTION OF EMBODIMENTS OF THE INVENTION

To facilitate comprehension of the drawings, the tension roller is depicted in heavy lines in the maximum tension position and in fine lines in the maximum retracted position.

Figure 1:
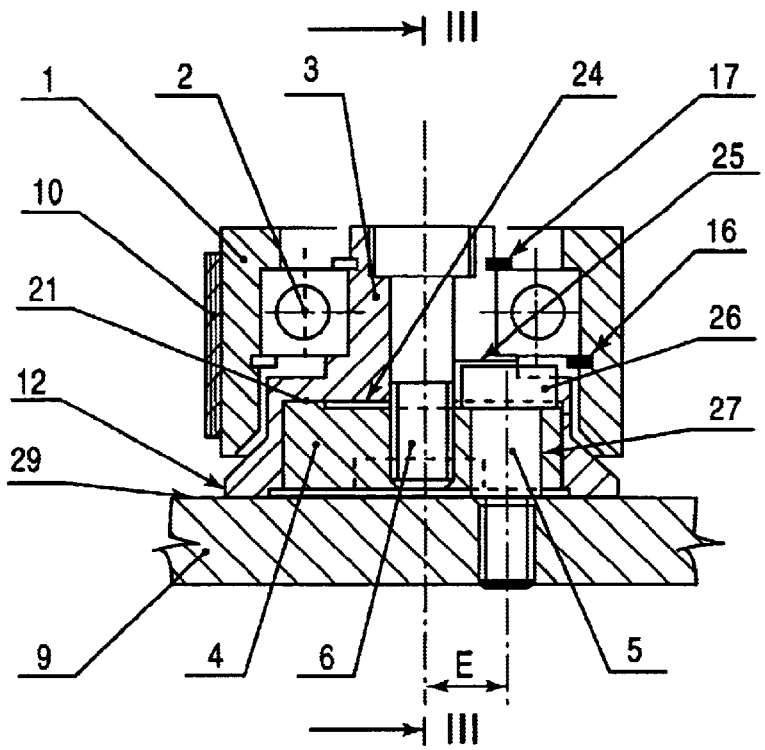
FIG. 1 depicts a cross-sectional view of the device according to the invention.
Figure 2:
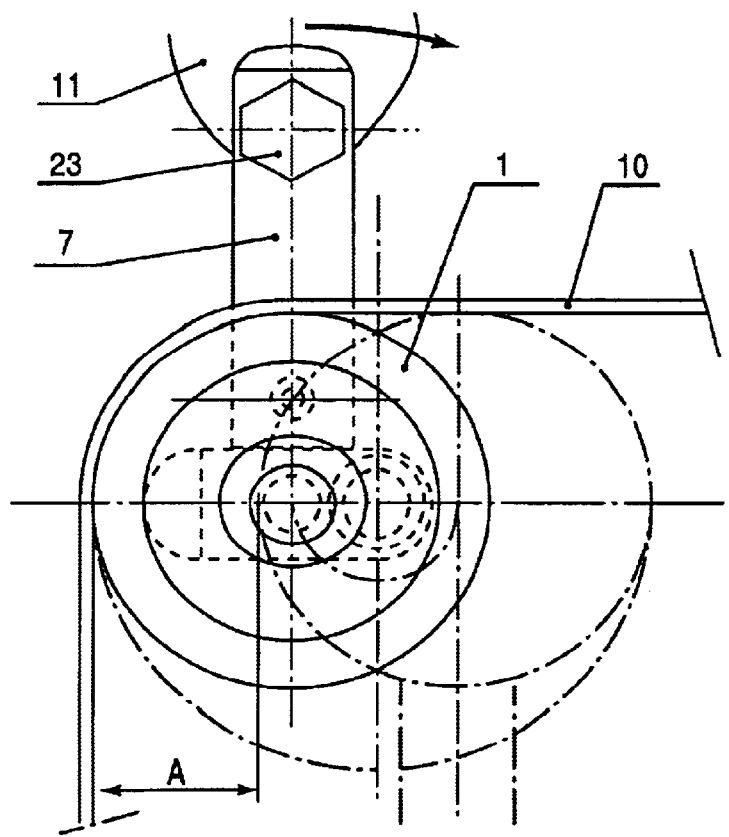
FIG. 2 depicts a top view of the device.
Figure 3:
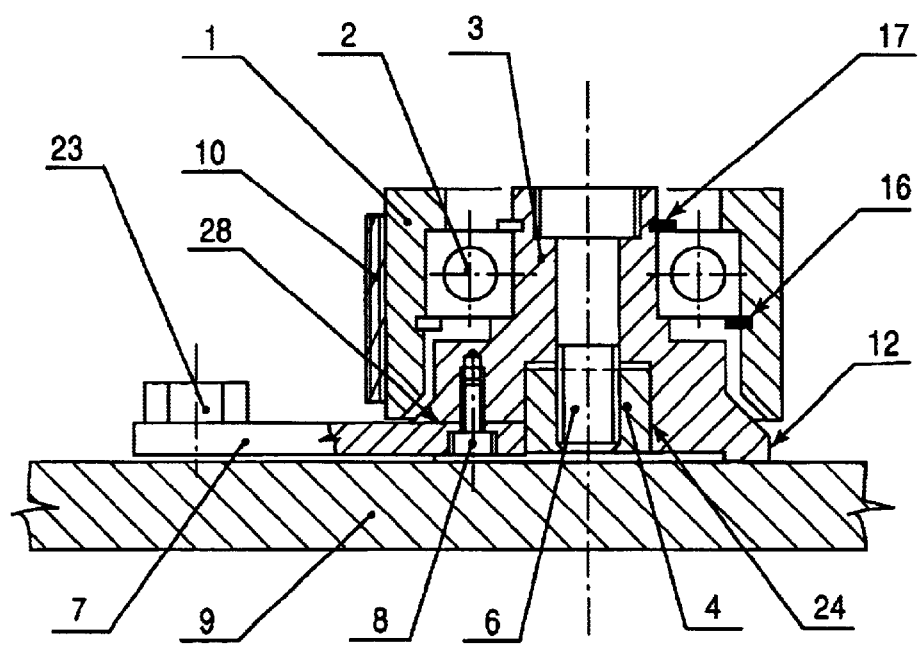
FIG. 3 depicts a cross-sectional view along III—III of FIG. 1 of the device of the invention.

With reference to the drawings FIG. 1, FIG. 2, and FIG. 3, the device has an external cylindrical roller (1), of a shape adapted to each type of transmission and constituting, in the drawings, a pulley for a belt (10) accommodating one or a plurality of ball bearings (2), which are integral with a central shaft made up of a hub (3) through which passes a clamping screw (6) which acts on a flange or intermediate part (4) placed freely in a housing (24) of the hub (3). This intermediate part (4) makes it possible to create a lateral offset (E) between the axis of the clamping screw (6) and a fixed pivot pin (5) integral with the bearing surface (29). This fixed pivot pin (5) is made up of a cylindrical part (27) constituting the rotational guide of the hub (3), with a height defined between two faces, one of which rests on the bearing surface (29) and the other is formed by the bottom of a cylindrical head (26) which extends radially beyond the part (27) and which engages freely in a suitable housing (25) in the hub (3). The distance between centers of the axes obtained by the aforementioned lateral offset (E) enables, by the rotation of the hub (3) around the pin (5), when the screw (6) has not yet been tightened, making the hub (3) travel a circular path (A) which constitutes the tensioning stroke of the device, the tightening of the screw (6) in the intermediate part (4) which acts as a clamping means and is supported at one of its ends having a projection (21) in the bottom of the housing (24), and at the other end on the head (26) of the fixed pivot pin (5), which immobilizes the hub (3) against the bearing surface (29) by pressure and adhesion in the position determined.

The stability of the unit is guaranteed by the large-diameter base (12) of the hub (3). The fixed pivot pin (5) is made up of a shouldered, threaded shaft, of which the central cylindrical portion permits free pivoting and longitudinal sliding of the intermediate part (4) between, on the one hand, the head of the shaft constituting the bearing surface of the intermediate part (4) and the other, the bearing surface of the shaft on the transmission support (9). This bearing surface is created by the fact that the threaded portion is of a smaller diameter than the cylindrical portion.

In the embodiment according to FIGS. 2 and 3, the hub (3) has in its base (12) a housing (28) accommodating a lower driving arm (7), integral with the hub (3), by the screw (8) enabling, with an off-the-shelf open-end wrench (11) or a torque wrench not depicted in the drawing, pivoting the device around the fixed pivot pin (5) and thus tensioning the transmission (10).

The use of a torque wrench enables simultaneously applying and measuring the effort exerted and thus obtaining a determined, reproducible tensioning of the transmission (10).

In the embodiment according to FIG. 3, if the screw (8) is not installed, the driving arm (7) is removable and slides into the housing of the hub (3) to be removed, after tensioning of the transmission, when the space requirement of the device must be reduced.

In the embodiment according to FIGS. 2 and 3, the driving arm (7) may have, at its end, a polygon-shaped protruding portion (23) enabling the use of off-the-shelf clamping tools: open-end wrench (11), box wrench, ring wrench, adjustable wrench, socket wrench. These wrenches can equip a torque wrench not shown in the drawings, enabling simultaneously applying and measuring the effort exerted and thus obtaining a determined, reproducible tensioning of the transmission (10).

The installation of the device is carried out in two phases: placement of the intermediate part (4) and the fixed pivot pin (5) on the transmission support (9), then the unit made up of the hub (3) equipped with the bearing (2) held by the stop rings (16) and (17), and of the roller (1), will be assembled with the intermediate part (4) by the clamping screw (6).

Figure 4:
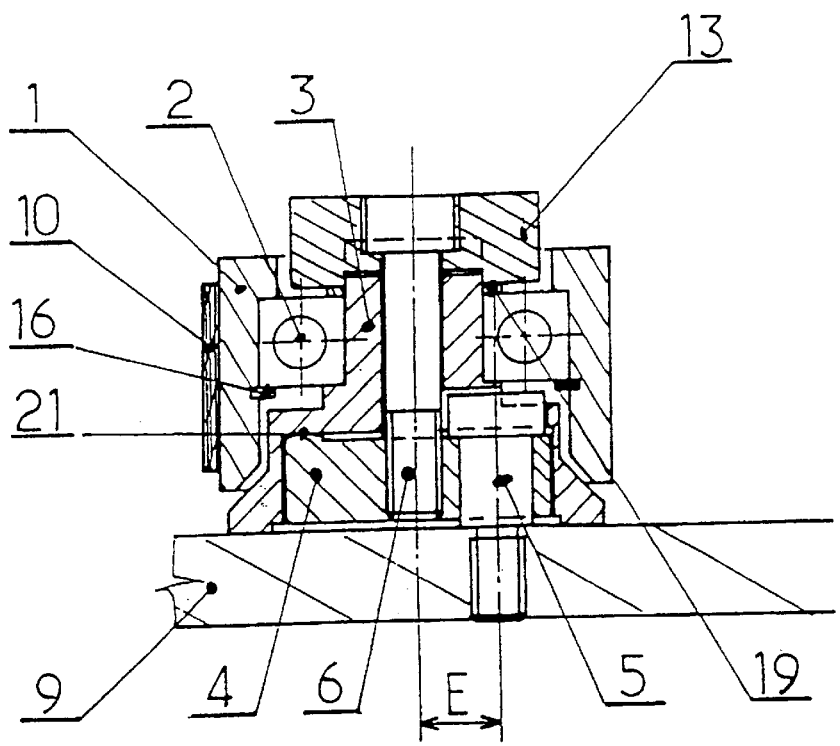
FIG. 4 depicts a cross-sectional view of a second embodiment of the device.
Figure 5:
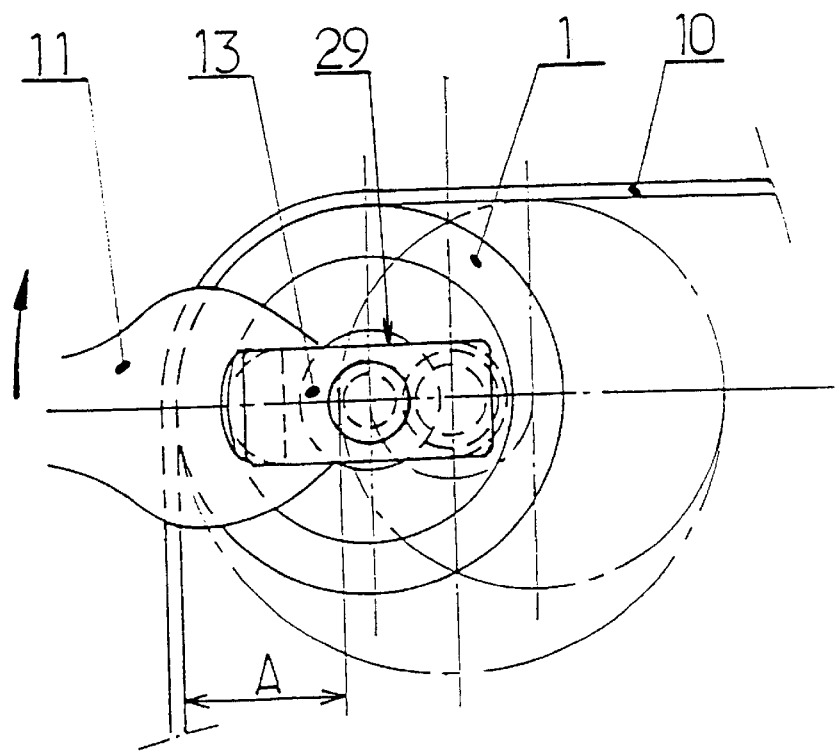
FIG. 5 depicts a top view of this variant embodiment of the device.

Referring to the drawings of FIG. 4 and FIG. 5, the hub (3) has, in its upper part, a housing accommodating a driving arm (13), held against the brace (19), integral with the hub (3), by the screw (6), which makes it possible, using an off-the-shelf open-end wrench (11) or a torque wrench not shown in the drawing, to pivot the device around the pivot pin (5) and thus to tension the transmission (10). The use of a torque wrench enables applying and measuring the effort exerted and thus obtaining a determined, reproducible tensioning of the transmission.

The installation of the device, the fixation by the fixed pivot pin (5), the tensioning of the transmission by the driving arm (7) or the driving arm (13) as well as locking in position of the device by the clamping screw (6) can be carried out above the transmission support (9).

Figure 6:
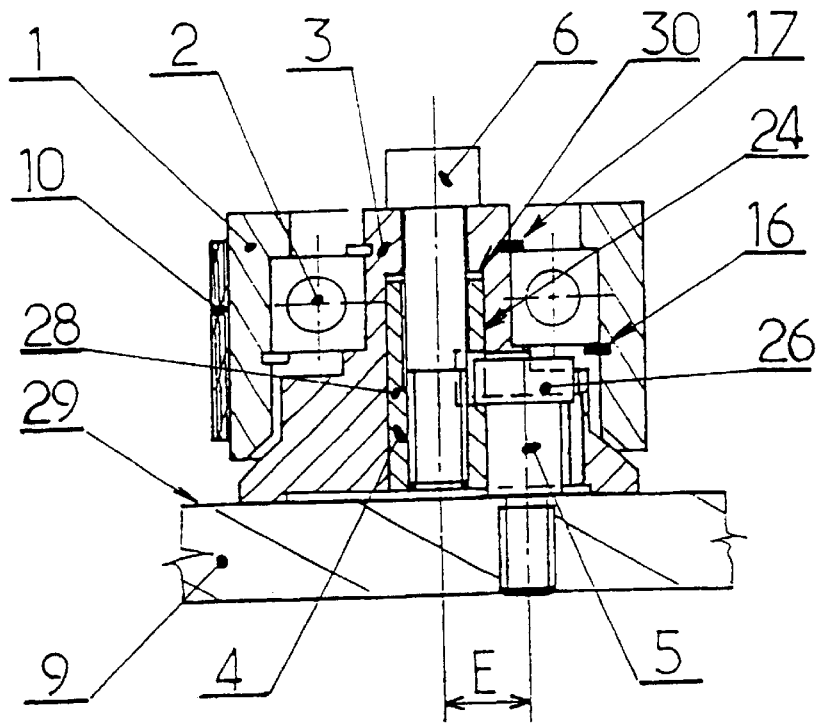
FIG. 6 depicts a cross-sectional view of a third embodiment.
Figure 7:
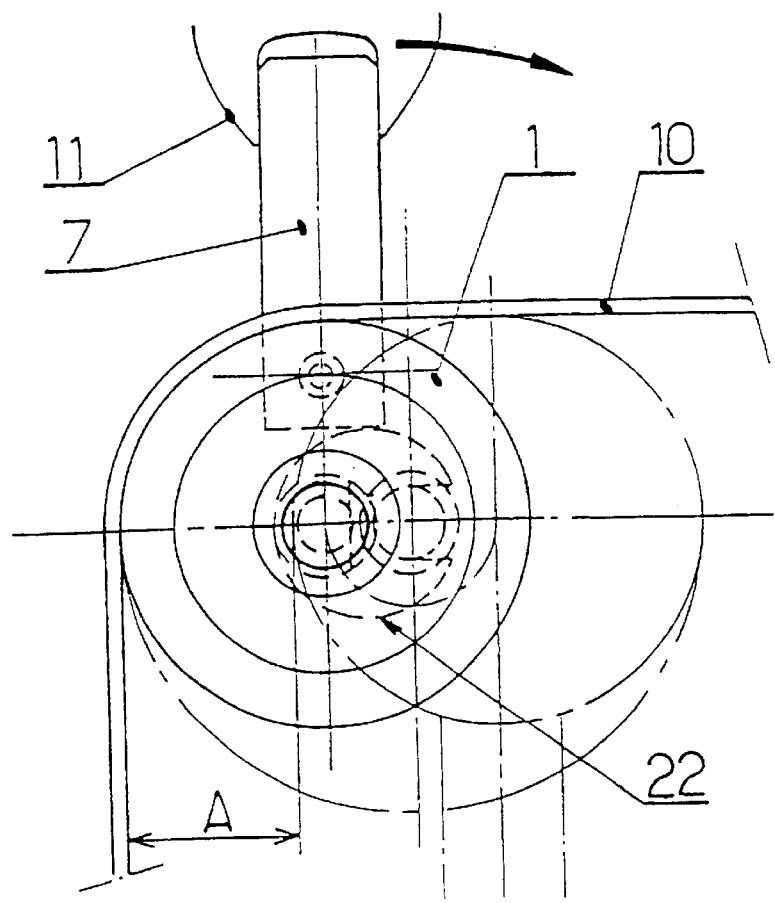
FIG. 7 depicts a top view of this third embodiment.

In the embodiment according to FIGS. 6 and 7, the intermediate part (4) is made up, on the one hand, of a guide (28) sliding into a hole (24) in the hub (3) parallel to the axis of rotation of the roller (1) and, on the other, of a flange (22) perpendicular to and extending the guide (28) supported under the head (26) of the fixed pivot pin (5), which immobilizes the hub (3) on the bearing surface (29) by pressure and adhesion in the determined position. The flange (22) of the intermediate part (4) can have an open groove, enabling its installation under the head of the pivot pin (5); rotational guidance of the hub (3) is provided by the centering of the head (26) of the fixed pivot pin in a housing provided in the hub (3).

In the embodiment according to FIG. 8, if the fixation of the device from below the transmission support (9) is desired, the intermediate part (4) may have an internal screw thread accommodating the fixed pivot pin (5) accessible from below the transmission support (9) which has an opening accommodating the cylindrical portion (27) of the fixed pivot pin (5), with the head (26) of said pin being supported under the support of the transmission; the tightening of the clamping screw (6) provides immobilization of the hub (3) on the bearing surface (29), by pressure and adhesion.

In an embodiment not depicted, if fixation of the device from below the transmission support (9) is desired, the intermediate part (4) may have, in its flange (22), an internal screw thread accommodating a fixed pivot pin (5) accessible from below, pivoting and sliding in the transmission support (9), and enabling the free pivoting of the intermediate part (4).

Figure 8:
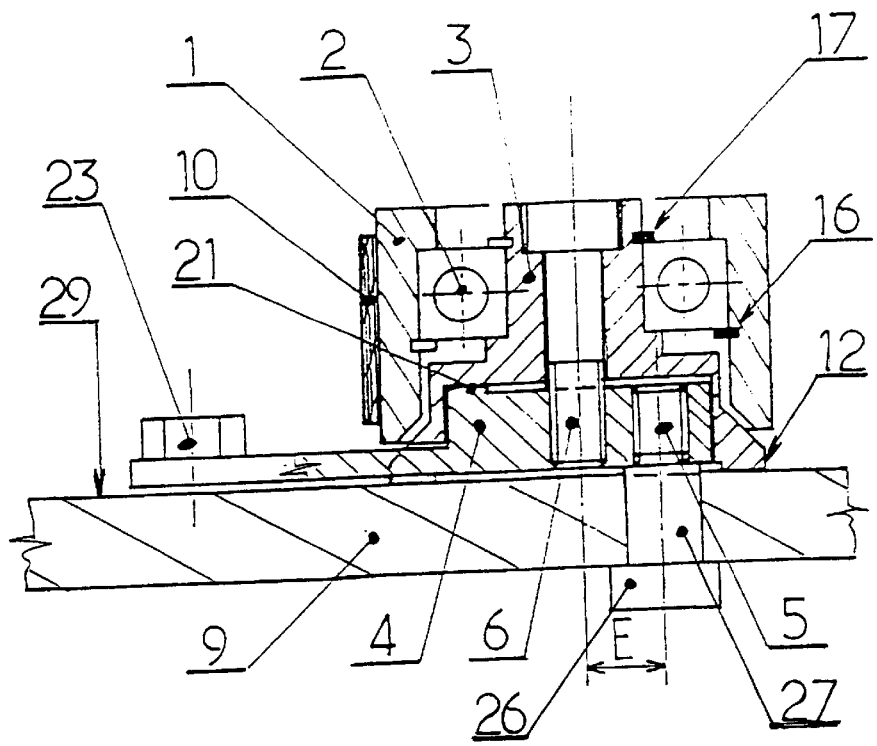
FIG. 8 depicts a cross-sectional view of a fourth embodiment.
Figure 9:
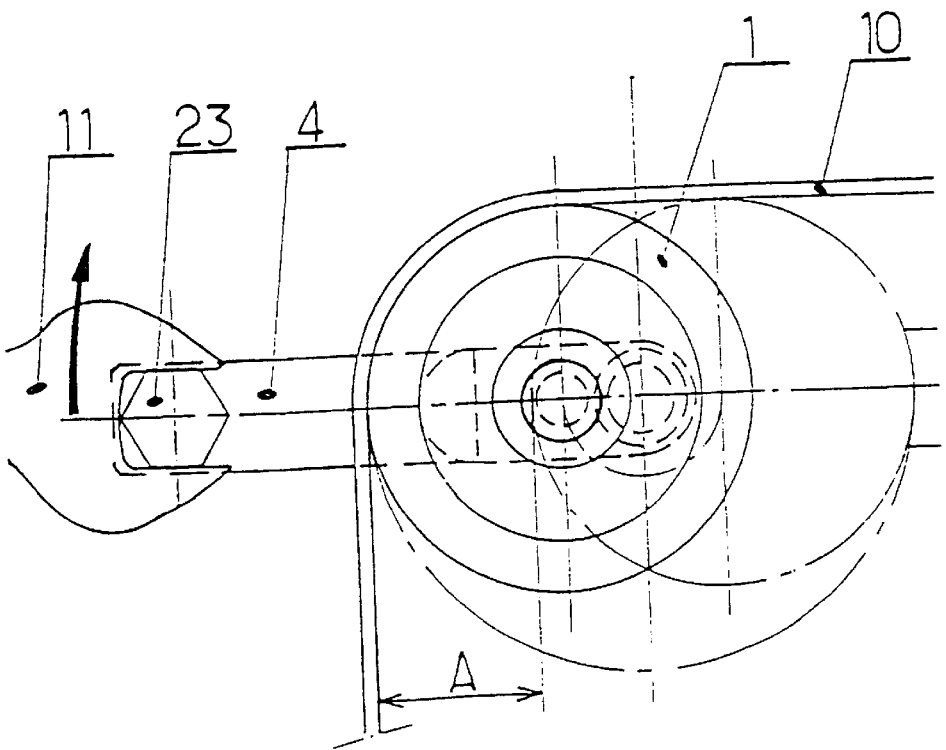
FIG. 9 depicts a top view of this fourth embodiment.

In the embodiment according to FIGS. 8 and 9, the intermediate part (4) is extended beyond the exterior of the base (12) of the hub (3) and forms the driving arm.

In the embodiment according to FIGS. 8 and 9, the intermediate part (4), when it is extended, forms the driving arm and can have at its end a protruding, polygonal part (23) enabling the use of off-the-shelf clamping tools: open-end wrench (11), box wrench, ring wrench, adjustable wrench, or socket wrench. These wrenches may equip a torque wrench not shown in the drawings, enabling simultaneously applying and measuring the effort exerted and thus obtaining a determined, reproducible tensioning of the transmission (10).

Figure 10:
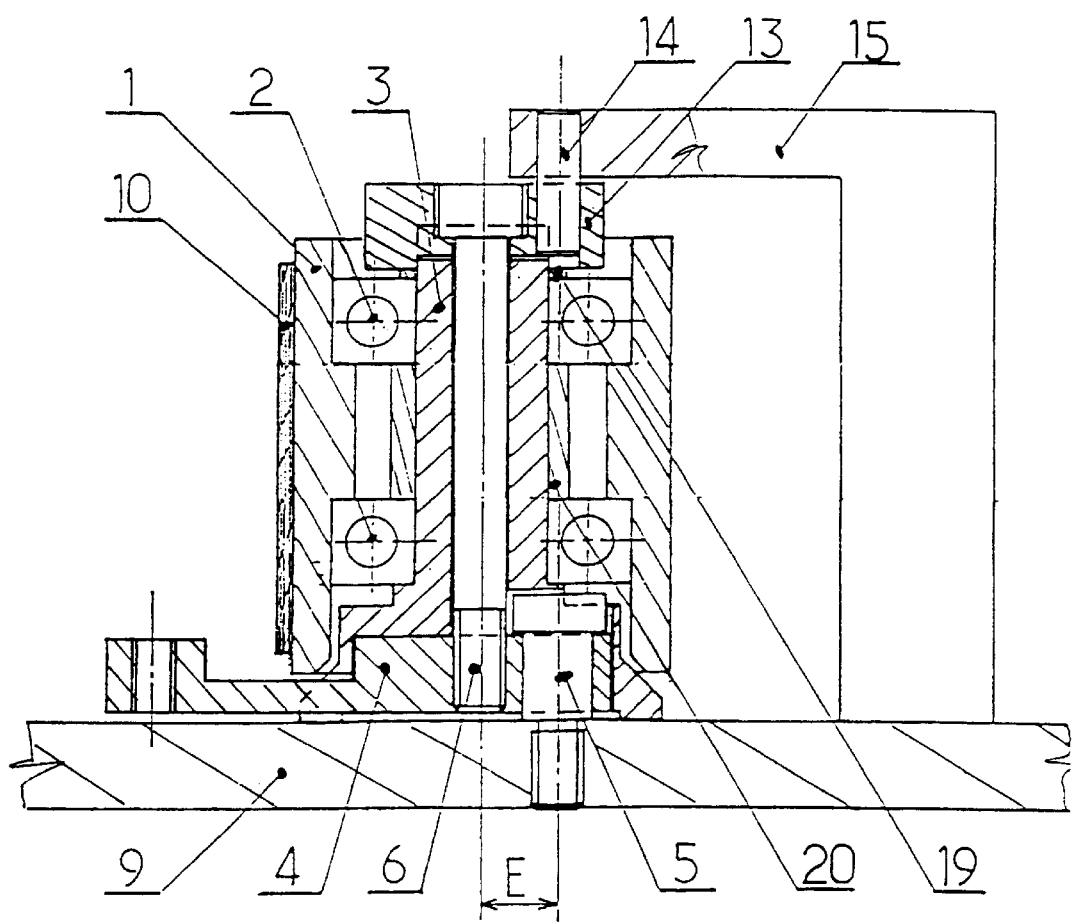
FIG. 10 depicts a cross-sectional view of another variant of this device.

In the embodiment according to FIG. 10, the tensile loads of very wide belts can make the out-of-line fixation of the device inadequate. In this case, the upper driving arm (13) can have a bore accommodating a pin (14), concentric to the fixed pivot pin (5), enabling, by a support (15) integral with the transmission support (9), holding the end of the hub (3). The outer roller (1) may have several ball bearings (2). The upper driving arm (13) is encased in a groove of the hub (3) and centered perpendicularly on the hub (3) by a joggle in its bearing surface on the brace (19). The ball bearings (2) are braced by the block (20).

In embodiments not shown, the driving arm (7) may constitute a part of the hub (3), in particular, in the case in which the hub (3) is fabricated in a single molding operation.

The device according to the invention is intended, in particular, for the tensioning of transmission of rotational movements, in areas extending, by way of nonrestrictive examples, from office equipment to industrial machines.

What is claimed is:

1. Device for tensioning and immobilization in an eccentric-forming roller for tensioning a transmission of rotational moments, the device enabling adjustment and fixing of a hub of the tension roller in a determined angular position, on a bearing surface, by means of a clamping screw passing through the hub, the device comprising:
    an intermediate part freely placed in a first housing provided in the hub, a fixed pivot pin integral with the bearing surface and consisting of a cylindrical portion constituting a rotational guide of the hub, said cylindrical portion having a defined height, between two faces, one of which rests on the bearing surface and the other is formed by the underface of a cylindrical head which extends radially beyond the cylindrical portion and which protrudes freely in a second housing provided in the base of the hub, the intermediate part being supported at one end having a projection by a bottom of the first housing and at another end by the head of the fixed pivot pin, the clamping screw passing through the hub and acting on the intermediate part, the intermediate part enabling creation of a lateral offset between an axis of the clamping screw and an axis of the fixed pivot pin, so that a distance between the axis of the clamping screw and the axis of the fixed pivot pin obtained by the lateral offset enables (i) making the hub travel a circular path which constitutes a tensioning stroke of the device by rotation of the hub around the fixed pivot pin when the clamping screw has not yet been tightened, and (ii) immobilizing the hub against the bearing surface by pressure and adhesion in the angular position determined by tightening of the clamping screw in the intermediate part which acts as a clamping means.

2. Device according to claim 1,
wherein
the hub has, in the base, a third housing accommodating a lower driving arm integral with the hub extending beyond the exterior of the base of the hub, said lower driving arm enabling, with an off-the-shelf open-end wrench or a torque wrench, pivoting the device around the pivot pin and, thus, tensioning the transmission.

3. Device according to claim 2,
wherein
the hub has, in an upper portion, a fourth housing accommodating an upper driving arm, integral with the hub, said upper driving arm enabling, with an off-the-shelf open-end wrench or torque wrench, pivoting the device around the fixed pivot pin and, thus, tensioning the transmission.

4. Device according to claim 3,
wherein
the lower driving arm and the upper driving arm have ends suitable to accommodate additional devices for adjustment and position immobilization of the hub of the tension roller, devices for pulling or pushing by flexible or elastic elements, devices for pulling or pushing by remote control activators or control and safety devices detecting defects in the tensile load or the angular position of the tension roller.

5. Device according to claim 3,
wherein
the intermediate part has no projection, the tightening of the clamping screw holds said intermediate part in the bottom of the first housing of the hub in a defined position, enabling the free pivoting of the intermediate part under the head of the fixed pivot pin and, consequently, the free pivoting and sliding of the hub on the bearing surface with the tensile load being obtained by the action of a pulling or pushing device acting on one or the other of the two driving arms.

6. Device according to claim 3,
wherein
the lower driving arm is a specific part, is removable and can be removed from the base of the hub by sliding in the fourth housing after adjustment of the tension of the transmission.

7. Device according to claim 3,
wherein
the lower and the upper driving arms have, at their end, a polygon-shaped protruding portion, enabling the use of off-the-shelf clamping tools selected from the group consisting of open-end wrench, box wrench, ring wrench, adjustable wrench, socket wrench, and torque wrench.

8. Device according to claim 3,
wherein
the upper driving arm has a bore accommodating a pin concentric with the fixed pivot pin, enabling holding an end of the hub by a support integral with the transmission support.

9. Device according to claim 2,
wherein
the lower driving arm has an end suitable to accommodate additional devices for adjustment and position immobilization of the hub of the tension roller, devices for pulling or pushing by flexible or elastic elements, devices for pulling or pushing by remote control activators or control and safety devices detecting defects in the tensile load or the angular position of the tension roller.

10. Device according to claim 2,
wherein
the lower driving arm is a specific part, is removable and can be removed from the base of the hub by sliding in the third housing after adjustment of the tension of the transmission.

11. Device according to claim 2,
wherein
the lower driving arm has, at an end thereof, a polygon-shaped protruding portion, enabling the use of off-the-shelf clamping tools: selected from the group consisting of open-end wrench, box wrench, ring wrench, adjustable wrench, socket wrench, and torque wrench.

12. Device according to claim 1,
wherein
the intermediate part is constituted of a guide sliding in a fifth housing of the hub parallel to an axis of rotation of the roller, and a flange perpendicular to and extending the guide being supported under the head of the fixed pivot pin, which immobilizes the hub on the bearing surface by pressure and adhesion in the angular position determined.

13. Device according to claim 1,
wherein
the intermediate part has an internal screw thread accommodating the fixed pivot pin accessible from below the bearing surface which has an opening accommodating the cylindrical portion of the fixed pivot pin, the head of said pin being supported under the transmission support, the tightening of the clamping screw ensuring immobilization of the hub on the bearing surface by pressure and adhesion.

14. Device according to claim 1,
wherein
the intermediate part is extended beyond the exterior of a base of the hub and constitutes a driving arm enabling exertion of the tensile load.

15. Device according to claim 14,
wherein
the intermediate part has at an end of the driving arm a polygon-shaped protruding portion, enabling the use of off-the-shelf clamping tools: open-end wrench, box wrench, ring wrench, adjustable wrench, socket wrench, torque wrench.

16. Device according to claim 1,
wherein
the hub has, in an upper portion, a fourth housing accommodating an upper driving arm, integral with the hub, enabling, with an off-the-shelf open-end wrench or torque wrench, pivoting the device around the fixed pivot pin and, thus, tensioning the transmission.

17. Device according to claim 16,
wherein
the upper driving arm has an end suitable to accommodate additional devices for adjustment and position immobilization of the hub of the tension roller, devices for pulling or pushing by flexible or elastic elements, devices for pulling or pushing by remote control activators or control and safety devices detecting defects in the tensile load or the angular position of the tension roller.

18. Device according to claim 16,
wherein
the upper driving arm has, at an end thereof, a polygon-shaped protruding portion, enabling the use of off-the-shelf clamping tools: open-end wrench, box wrench, ring wrench, adjustable wrench, socket wrench, torque wrench.

19. Device according to claim 16,
wherein
the upper driving arm has a bore accommodating a pin concentric with the fixed pivot pin, enabling holding an end of the hub by a support integral with the transmission support.

* * * * *